(12) United States Patent
Sharma et al.

(10) Patent No.: US 6,501,567 B2
(45) Date of Patent: Dec. 31, 2002

(54) METHOD AND SYSTEM FOR DESIGNING SPATIALLY-PARTITIONED AND CORRELATED STOCHASTIC SCREENS FOR COLOR HALFTONING

(75) Inventors: Gaurav Sharma, Webster, NY (US); Shen-Ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 228 days.

(21) Appl. No.: 09/737,537

(22) Filed: Dec. 15, 2000

(65) Prior Publication Data

US 2002/0114011 A1 Aug. 22, 2002

(51) Int. Cl.$^7$ .............................................. G06K 15/00
(52) U.S. Cl. .................... 358/3.19; 358/3.03; 358/3.07; 358/3.1
(58) Field of Search ................................. 358/1.9, 3.01, 358/3.03, 3.07, 3.1, 3.19, 3.21

(56) References Cited

U.S. PATENT DOCUMENTS 4,241,153 A  * 12/1980 Rovnjer ........................ 430/4
4,339,774 A  *  7/1982 Temple ....................... 358/283
5,631,748 A       5/1997 Harrington .................. 358/502
6,376,834 B1 *  4/2002 Hastings ..................... 250/234

* cited by examiner

Primary Examiner—Jerome Grant, II
(74) Attorney, Agent, or Firm—Fay, Sharpe, Fagan, Minnich & McKee, LLP (57) ABSTRACT

A method and system for designing a plurality of correlated stochastic screens or conjugate screen portions intended for use in color halftoning of a corresponding plurality of color separations. A merit function is associated with each screen or screen portion. The merit function represents a measure of the desirability of the screen, particularly with regard to maximizing ink dispersion and optimizing spatial frequency response. An additional merit function value is associated with a combination of the screens and screen portions. Additional merit function represents a measure of desirability of the screen combination with regard to ink dispersion and combined spatial frequency response. The merit functions are iteratively applied to possible screens until an optimized merit value is calculated. The screens are selected that correspond to the optimized merit value. The image is generated using the selected screens in a conventional color halftoning process with a plurality of color separations.

15 Claims, 6 Drawing Sheets

METHOD AND SYSTEM FOR DESIGNING SPATIALLY-PARTITIONED AND CORRELATED STOCHASTIC SCREENS FOR COLOR HALFTONING

FIELD OF THE INVENTION

The subject invention pertains to the art of color image/text printing or display systems, and is especially applicable to a method and apparatus wherein color halftoning (representing a continuous tone image with a binary representation) is implemented with a partitioned stochastic screen or correlated stochastic screens for maximal ink dispersion and optimized spatial frequency response in the printing or display process.

BACKGROUND OF THE INVENTION

In today's business and scientific world color has become essential as a component of communication. Color facilitates the sharing of knowledge and ideas. Companies involved in the development of digital color print engines are continuously looking for ways to improve the accuracy and total image quality of their products.

Color images are commonly represented as one or more separations, each separation comprising a set of color density signals for a single primary or secondary color. Color density signals are commonly represented as digital gray or contone pixels, varying in magnitude from a minimum to a maximum, with a number of gradients between corresponding to the bit density of the system. Thus, a common 8 bit system provides 256 shades of each primary color. A color can therefore be considered the combination of magnitudes of each pixel, which when viewed together, present the combination color. Usually, printer signals include three subtractive primary color signals (Cyan, Magenta and Yellow) and a Black signal which together can be considered the printer colorant signals. Each color signal forms a separation and when combined together with the other separations, forms the color image.

Document Processing System devices ("DPS") refers to a set of devices that construct, produce, print, transmit, scan, store and archive documents and their constituent elements. Such devices include marking engines, printers, scanners, fax machines, electronic libraries, and the like many of which can be employed in a xerographic environment. The present invention addresses situations particularly relevant to printing systems and discusses them as a prime example of a Document Processing System, but should not be construed to be limited to any such particular printing application. Any DPS is intended to benefit from the advantages of this invention.

Printers provide a limited number of output possibilities, and are commonly binary, i.e., they produce either a dot or no dot at a given pixel location. Thus, given a color separation with 256 shades of each additive primary color, a set of binary printer signals must be produced representing the contone effect. This process is referred to as halftoning. In such arrangements, over a given area and the separation having a number of contone pixels therein, each pixel value of an array of contone pixels within the area is compared to one of a set of preselected thresholds (the thresholds may be stored as a dither matrix and the repetitive pattern generated by this matrix is considered a halftone cell) as taught for example in U.S. Pat. No. 4,149,194 to Holladay. The effect of such an arrangement is that, for an area where the image is a contone, some of the thresholds in the matrix will be exceeded, i.e., the image value at that specific location is larger than the value stored in the dither matrix for that same location, while others are not. In the binary case, the pixels or cell elements for which the thresholds are exceeded might be printed as black or some color, while the remaining elements are allowed to remain white or uncolored, dependent on the actual physical quantity described by the data. Since the human visual system tends to average out rapidly varying spatial patterns and perceives only a spatial average of the micro-variation in spot-color produced by a printer, the halftone process described above can be used to produce a close approximation to the desired color in the contone input.

The dither matrix of threshold values is often referred to as a "screen", and the process of generating the binary image from the contone image using the screen is called "screening". Conventional digital halftones start as a number of isolated dots which grow bigger as more colorant is requested on the paper. These screens are referred to as clustered-dot screens. The fundamental rate at which the dots in a clustered dot screen are repeated is commonly referred to as the screen's spatial frequency [Note R. Ulichney, "Digital Halftoning", MIT Press, Cambridge, Mass., 1987]. The higher the screen spatial frequency, the finer and smoother appearing the image and also the greater is the capacity for the dots to represent fine detail in the image. Dithering creates problems in color document reproduction where the repeating pattern of a screen through the image, when superposed over similar repeating patterns in multiple separations, can cause moiré or other artifacts, particularly in a printing system with less than ideal registration between separations.

Stochastic, or non-periodic screening is an alternative to conventional clustered dot screens. Instead of producing dots that grow with increased colorant on paper, the stochastic screening method produces a well-dispersed pattern of isolated dots at spaced pixel locations. Thus there is no fundamental periodicity in the dots, instead the design of the screen attempts to produce patterns with pleasant noise characteristics. The pleasant noise characteristics are achieved by designing the screen so as to distribute the noise energy in the region of high spatial frequency, where the human visual system has a significantly reduced sensitivity. In this respect, U.S. Pat. No. 5,673,121 to Wang, discloses a stochastic halftone screening method for designing an idealized stochastic screen and is herein incorporated by reference as it discloses a particular stochastic screen useful in implementation of the subject invention, as will be more fully explained below. One of the advantages of stochastic, or non-periodic screening over periodic screening, is the suppression of moire.

Color stochastic screening has typically been implemented in the prior art by using the same screen for all separations (dot-on-dot) or by using independent screens (possibly obtained by shifting/rotating/flipping a single screen). These methods do not produce halftones with maximal ink dispersion and optimized spatial frequency response because there is no control of the overlap between the printed dots for different separations. The less successful the screening processes, the less smooth, i.e. more grainy, the resultant image appears. It is of course an overall objective of the subject invention to produce a resultant image in which the graininess is minimized, smoothness is enhanced and the intended colors are accurately reproduced.

One way to design and promote the desirable aspects of a single screen is through application and assessment of a "merit function" to the screen. Consider a halftone screen with N different threshold values, from 1 to N. The binary output B(x, y) is determined by the following dithering rule:

$$B(x,y)=1 \text{ if } G(x,y) \geq T(x,y);$$
$$B(x,y)=0 \text{ elsewhere} \quad (1)$$

where x, y are the spatial coordinates, T is the threshold value at (x, y) and G is the gray-level input ranging from 0 to N. The value one of the output B represents a white pixel and zero, a black pixel. Without dot overlapping, a binary halftone pattern corresponding to a constant input level G will have G black pixels and N−G white pixels within the area defined by the halftone screen. The visual appearance of this halftone pattern depends on whether the black pixels or the white pixels are minorities. If the white pixels are, i.e., G<N/2, the appearance of the output should be based on the distribution of white pixels. Otherwise, the appearance should be on the distribution of black pixels. A merit function can be used to combine evaluations of all levels, thus, a half of the merit is on distributions of black pixels and another half is on white. The quantitative measure of visual evaluation on halftone outputs varies with specifications of the desired screens. For example, it is visually pleasant to have all minority pixels "evenly" distributed on the output of a stochastic screen. Mathematically, it could be translated as maximizing the summation of all distances between any two minorities. In general, the contribution to the merit function from each gray level can be written as a function of the gray level and locations of all minorities appearing at this level. Since being minority or majority is determined by the dithering rule given by Eq. (1), in consequence, the contribution Q at level G can be written as a function of G and locations of corresponding thresholds in the halftone screen:

$$Q(G)=Q(G; x_1, y_1; x_2, y_2; \ldots x_G, y_G), \text{ if } G<N/2$$
$$Q(G)=Q(G; x_{G+1}, y_{G+1}; x_{G+2}, y_{G+2}; \ldots x_N, y_N) \text{ elsewhere}, \quad (2)$$

where $x_T$, $y_T$ are coordinates of a threshold T.

The entire merit function M can be defined as a sum of contributions Q(G) from all levels:

$$M = \sum_{G=0}^{N} w(G)Q(G), \quad (3)$$

where w(G) is a weighting function of G. The objective of optimization is to maximize (or minimize) the single-value merit function M given above. Since the merit is used throughout the entire optimization process, the design can reach the best balance of all gray levels and the best compromise between given constraints in size, shape and other geometrical requirements.

Simulated annealing is a standard optimization technique and it has many different variations and modifications. It can be usefully applied to halftone screen design by analogizing the temperature to control the acceptance of a random swapping of screen threshold values in the iterative computing of the merit function to identify an optimized merit value. The acceptance is stochastically set by the temperature and compared with the change of the merit function due to swapping.

When the temperature is high, even a negative result could be accepted. So, the optimization would not easily fall into a local minimum. The temperature is gradually reduced during the optimization process and the final result is saved when the temperature drops to the low end. The flowchart of FIG. 1 demonstrates the basic optimization process for a single halftone screen design. At the beginning, all threshold values of the halftone screen are randomly set or copied from a previous design. The control temperature τ is set 20 to the starting temperature τ1. Whatever merit function is defined for the specific halftone screen is calculated 22.

Figure 1:
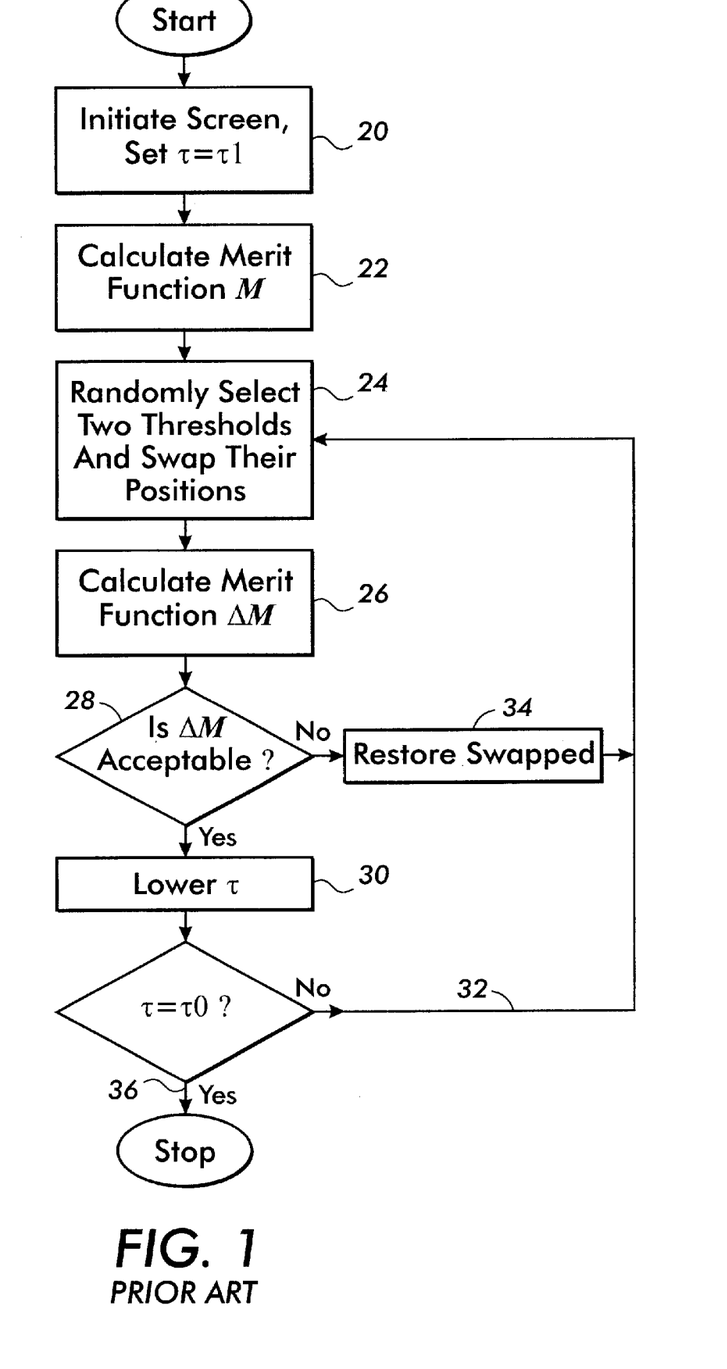
FIG. 1 is a flowchart illustrating the application of a merit function for the process of designing a single independent and non-related stochastic screen.

The optimization loop begins with a random selection 24 of two threshold values, T1 and T2. After swapping the selected thresholds, the change of the merit function due to swapping is calculated 26. In general, the entire merit function M does not need to be recalculated, instead, only the contribution of levels between T1 and T2. If the change of the merit function meets 28 the acceptance set by the current temperature of simulated annealing, the swapped order is kept, the temperature τ is lowered 30, and the process proceeds 32 to the next swapping loop. Otherwise, the order is restored 34 before swapping and movement on to the next loop. This iteration process is continued until the temperature reaches 36 a desired low level τ0 and the final configuration of the screen is saved. Of course, if the result is not satisfactory, the temperature is reset and the optimization is started over again. For stochastic screens, it is possible to simplify Eq. (2), the merit function Q(G) at each gray level G, to a summation form:

$$Q(G) = \sum_{i=1}^{G} \sum_{j=1}^{G} q(G; x_i, y_i; x_j, y_j), \quad \text{if } G < N/2, \quad (4)$$

$$Q(G) = \sum_{i=G+1}^{N} \sum_{j=G+1}^{N} q(G; x_i, y_i; x_j, y_j), \quad \text{elsewhere},$$

where q only depends on G and locations of a pair of thresholds. Under such circumstances, calculation of the merit function could be reduced. For example, if both selected thresholds are less than the mean, i.e., T1<T2<N/2, the change of the merit function due to swapping, ΔM, can be written as the following equation:

$$\Delta M = \sum_{G=T1}^{T2} w(G) \sum_{i=1}^{G} [q(G; x_{T2}, y_{T2}; x_i, y_i) - q(G; x_{T1}, y_{T1}; x_i, y_i)] \quad (5)$$

An idealized stochastic screen would create such output patterns with any constant input G so that all minority pixels were "evenly" separated. Mathematically, the above statement is equivalent to minimizing a merit function Q(G) given by Eq. (4), in which q(G; $x_1$, $y_1$, $x_j$, $y_j$) is a function of the distance between ($x_j$, $y_j$), or $$q(G; x_I, y_I; x_j, y_j) = \frac{1}{(x_i - x_j)^2 + (y_i - y_j)^2} \quad (6)$$

A merit function M, given by Eq. (3), summarizes Q(G) of all levels with a chosen weighting function w(G) for example, defined by $$w(G)=N/G, \text{ if } G<N/2;$$
$$w(g)=N/(N-G), \text{ elsewhere}. \quad (7)$$

Using the defined merit function above, individual stochastic halftone screens can be designed in different sizes and shapes. Since a halftone screen is applied repetitively in the dithering process, additional consideration of the periodicity should be applied to the function q given by Eq. (6). As a matter of fact, if one utilizes a look-up table with pre-calculated function q between pixels, most calculation involved in the optimization is simple addition and the simulated annealing can proceed very quickly.

BRIEF SUMMARY OF THE INVENTION

In accordance with the present invention, method and systems are provided for designing a plurality of correlated stochastic screens or conjugate screen portions intended for use in color halftoning of a corresponding plurality of color separations. A merit function is associated with each screen or screen portion. The merit function represents a measure of the desirability of the screen, particularly with regard to maximizing ink dispersion and optimizing spatial frequency response. An additional merit function is associated with the combination of the screens and screen portions. The additional merit function represents a measure of desirability of the screen combination with regard to ink dispersion and combined spatial frequency response. The screens are constructed so as to optimize the merit functions. The image is generated using the selected screens in a conventional color halftoning process with a plurality of color separations.

In one embodiment, the individual merit functions are combined into a single composite merit function using a weighted average and the screen construction process optimizes this composite merit function. Alternate, embodiments may utilize the individual merit functions in the screen construction process or may use forms of combination other than a simple weighted average.

The constructing of the plurality of screens preferably comprises an iterative process for optimizing the merit functions indicative of the desirability of each screen and the screen combination. The process starts with a random initial set of screens and iteratively modifies the screens for optimizing the chosen merit value or values. The merit functions are preferably based on placement of minority pixels for a plurality of tone and color values.

A principal advantage of the subject invention is a process for designing screens useful in color halftoning that achieve maximal ink dispersion and optimize the spatial frequency response in the imaging process.

Another advantage of the subject invention is a screen design process which facilitates screen design by assessing merit function values representative of maximal ink dispersion and optimized spatial frequency response through assessment of primary pixel locations.

Other objects and advantages will occur to others skilled in the art upon a reading and understanding of the present invention.

BRIEF DESCRIPTION OF THE DRAWINGS

The following brief descriptions of the drawings are presented for illustration purposes only and should not be limitative of the scope of the present invention, and wherein.

DETAILED DESCRIPTION OF THE PREFERRED EMBODIMENTS

While the present invention will hereinafter be described in connection with the preferred embodiments and the accompanying figures, it will be understood that it is not intended to limit the invention to those embodiments. On the contrary, it is intended to cover all alternatives, modifications and equivalents as may be included in the spirit and scope of the invention as defined by the appended claims.

The subject invention pertains to a method and system for stochastic screen design and implementation that maximizes ink dispersion and provides improved smoothness for combined printing of multiple color separations. The method applies concepts of either a partitioned single stochastic screen, or a plurality of distinct screens to a multicolor setting wherein the partitions or distinct screens are concurrently designed so that interseparation overlap is minimized for the color separations respectively associated with the partitions or screens and the appearance of the screen combinations is optimized in addition to the individual screens.

In one embodiment the second partition or a second screen is a conjugate of the first screen (or partition), wherein the thresholds are in reverse order.

In another embodiment, a merit function is employed to optimize screen configuration and includes merit factors for an analysis of a combination of the screens for maximizing dispersion of minority pixels. The merit function can comprise several formulations and for whatever embodiment is implemented, color relations between the distinct screens or partitions are computed to identify a maximal optimization value corresponding to the desired system output or print quality.

Figure 2A:
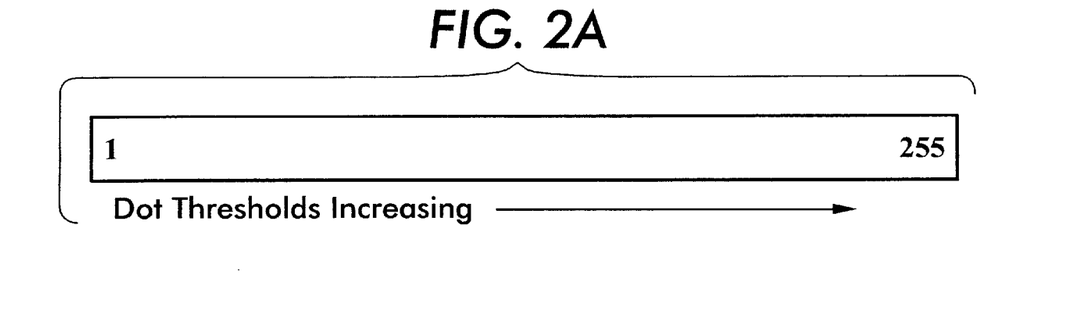
FIGS. 2(a)–2(d) are schematic representations of dot thresholds in increasing order.

For purposes of this description, it is assumed that the desired stochastic screen is designed to be linear in the number of pixels turned on. The stochastic screen is, e.g., a 128×128 array of thresholds between 1 and 255. When halftoning an image (one separation), a pixel is turned on if the image value at the pixel exceeds the threshold. The linearity of the screen implies that when a constant image with value V is halftoned, the fraction of the pixels turned on in the output is V/255 (or the nearest obtainable approximation) for all values of V between 0 and 255. FIG. 2(a) represents the screen by its thresholds. The linear array in FIG. 2(a) represents the thresholds of a dot in the screen in increasing order from left to right, going from 1 to 255. Each threshold represents all the pixels that get turned on just when the image reaches that value. A particular threshold or threshold region of the dot is filled by a given separation to indicate that the dots of that separation completely cover the pixels corresponding to that threshold/threshold region.

For two color separations, one simple way of minimizing overlap between the separations is to use the dot for one separation and the conjugate dot obtained by setting $threshold_{conjugate}(x, y)=256-threshold(x, y)$ for the other separation. (For example, the complementary white squares vs. the black squares on a checkerboard.)

Any poor spatial frequency characteristics of the halftone dot under simultaneous filling of the original and conjugate dots can be overcome by incorporating suitable constraints in the dot design process. For the screen design for this invention, the method described in U.S. Pat. No. 6,014,500 by Wang is used. The complete screen S is spatially partitioned into two regions S1 and S2 using a conjugate pattern as the basis of the partitioning (say the regions corresponding to the white pixels of the checkerboard are in S1 and those corresponding to black pixels are in S2.) The merit function of the screen is:

$$\underline{M}(S)=w0M(S)+w1M(S1)+w2M(S2) \qquad (8)$$

where M( ) is the merit function for the normal stochastic screen as described in U.S. Pat. No. 5,673,121 to Wang. In one implementation of this invention the weights were chosen to be w0=1, w1=3, w2=3. The rationale behind this choice of weights is explained later. For more details on the partitioning and the merit function, refer to U.S. Pat. No. 6,014,500 by Wang. The overall merit function is a weighted combination of three parts: M(S1) evaluates the quality of textures printed on only the S1 part of the screen (white part of checkerboard), M(S2) evaluates the quality of textures printed on only the S2 part of the screen (black part of checkerboard), and M(S) evaluates the quality of textures printed simultaneously on both the S1 and S2 parts of the screen. A complete fill-order for each separation is obtained by concatenating the fill-orders for the different sets of pixel locations in a chosen sequence, and the complete fill-order is utilized to create a screen. The screen design process returns a fill-order for pixels for each of the regions S1 and S2 such that when pixels are filled according to that order they have desirable spatial frequency characteristics in all three cases (a) when only S1 is filled, (b) when only S2 is filled, and (c) when both S1 and S2 are filled simultaneously.

Figure 2B:
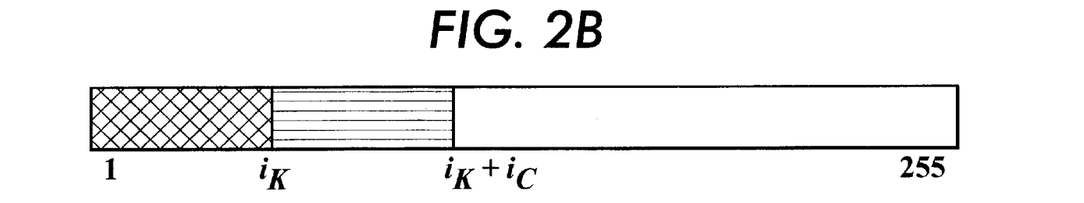
Figure 2C:
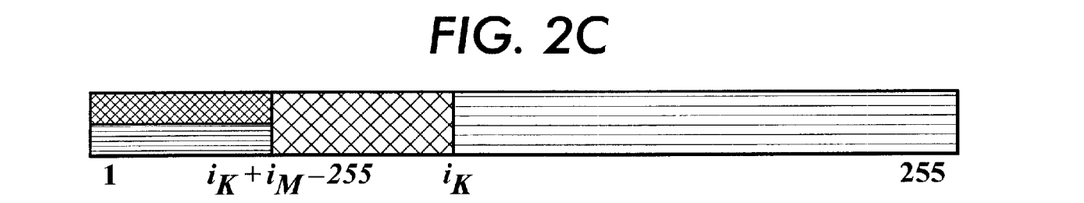

Once the screen is designed, it can be used for color halftoning of two separations as follows. One separation begins by successively filling the pixels corresponding to S1 in order till the 50% point and then fills the pixels corresponding to S2 in reversed order. The second separation begins by filling the pixels corresponding to S2 in order till the 50% point and then fills the pixels corresponding to S1 in reversed order. The above rule can be converted into a threshold based stochastic screen for the first separation, where levels 0 through 50% turn on pixels in the S1 part of the checkerboard in the fill-order obtained from the dot design, and levels between 50% and 100% turn on pixels in the S2 part of the checkerboard in the reverse-order from the fill-order obtained from the design. "$S_{ckr}$" denotes the screen designed with this process and "$t_{ckr}(x, y)$" the threshold array matrix corresponding to this screen. The rule for the second separation then corresponds to using the conjugate threshold screen (defined earlier as threshold$_{conjugate}$(x, y)–256–threshold(x, y)). Note that since single separations print only in one half of the checkerboard till they reach 50% coverage, it is important to weight the merit functions M(S1) and M(S2) heavily and therefore the weights in the merit function were chosen as w0=1, w1=3, w2=3, additional optimization of the weights may be performed to improve performance The halftoning method is generalized to CMYK halftoning by using the same screen for K and C with "separation in thresholds" (as described later), the conjugate screen for M, and with Y on an independent rotated screen. Since the Y separation produces almost no change in luminance in the print and because the yellow colorants tend to have the least unwanted absorptions, the use of an independent halftone screen for yellow causes minimum degradation in image quality. The idea behind "separation in thresholds" is the one used in U.S. Pat. No. 5,631,748 by Harrington and in U.S. Ser. No. 09/602,746, "Color halftoning using a single successive filling color stochastic screen", by Sharma, Fan and Wang. The basic idea is to first halftone the K separation and then modify the C separation to occupy the next higher levels of the screen. Thus, for a constant image with K and C contone values $i_K$ and $i_C$, respectively, the K separation occupies the first $i_K$ thresholds of the halftone screen and if there is no overlap required ($i_K+i_C<255$) the Cyan separation occupies thresholds from $i_K+1$ through $i_K+i_C$. (See FIG. 2(b)) If overlap is necessary, the thresholds are re-used starting at zero. This is shown graphically in FIG. 2(c). The actual modification required in the Cyan separation to achieve this objective is simply the addition of the halftone error from the black separation (contone input-halftone output).

Figure 4A:
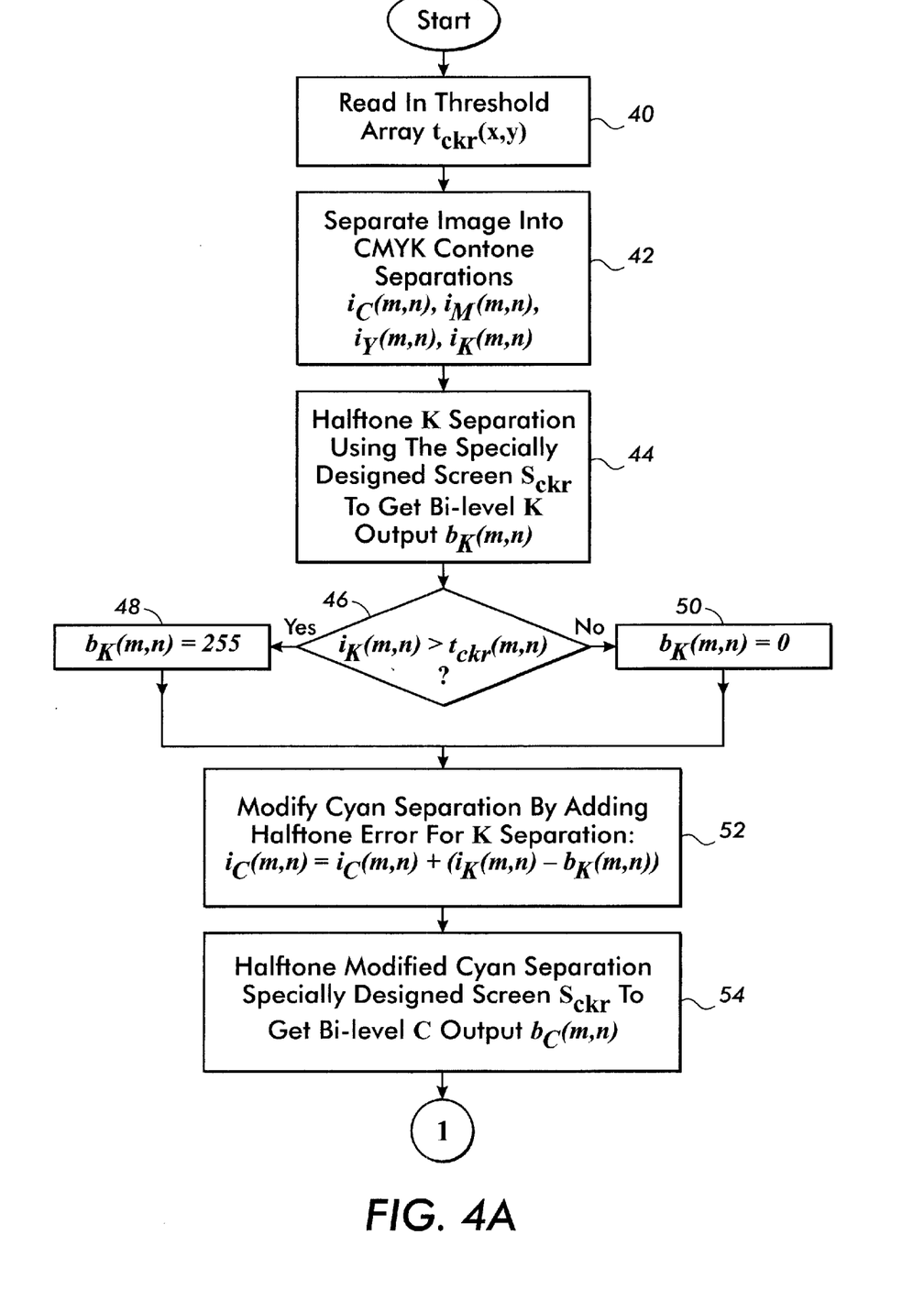
FIGS. 4(a) and 4(b) are flowcharts illustrating the process steps for processing a CMYK image in accordance with another embodiment of the invention; and, FIG. 5 is a flowchart illustrating the process steps for another embodiment of the invention.
Figure 4B:
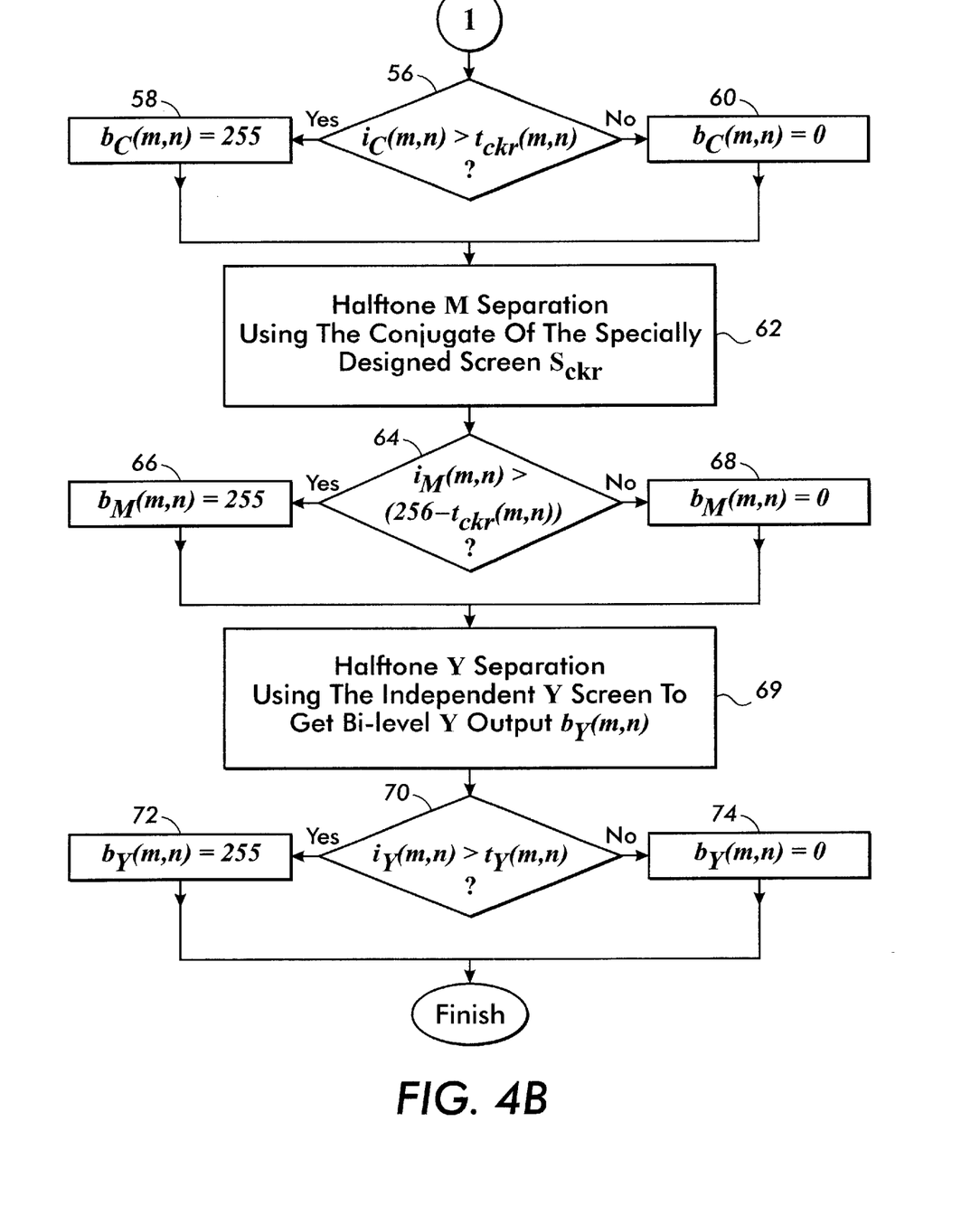

The complete algorithm for processing a CMYK image is illustrated in FIGS. 4(a) and 4(b) and may be summarized as:

1. Read in 40 threshold array $t_{ckr}(x, y)$ for the specially designed screen $S_{ckr}$ and an independent rotated screen $t_Y(x, y)$ for the yellow separation (the plane is tiled with these screens to get thresholds for each pixel location).
2. Separate 42 the image into CMYK contone separations $i_C(m, n)$, $i_M(m, n)$, $i_Y(m, n)$, $i_K(m, n)$.
3. Halftone 44 K separation using the specially designed screen $S_{ckr}$ to get bi-level K output $b_K(m, n)$ 46, 48, 50
   If (($i_K(m, n)>t_{ckr}(m, n)$) set $b_K(m, n)=255$
   Else set $b_K(m, n)=0$
4. Modify 52 Cyan separation by adding halftone error for K separation
   $i_C(m, n)=_{iCr}(m, n)+(i_K(m, n)-b_K(m, n))$
5. Halftone 54 modified Cyan separation specially designed screen $S_{ckr}$ to get bi-level C output $b_C(m, n)$ 56, 58, 60
   If (($i_C(m, n)>t_{ckr}(m, n)$) set $b_C(m, n)=255$
   Else set $b_C(m, n)=0$
6. Halftone 62 M separation using the conjugate of the specially designed screen $S_{ckr}$ 64, 66, 68
   If((iM(m, n)>(256-$t_{ckr}(m, n)$)) set $b_M(m, n)=255$
   Else set $b_M(m, n)=0$
7. Halftone 69 Y separation using the independent Y screen to get bi-level Y output $b_Y(m, n)$ 70, 72, 74
   If (($i_Y(m, n)>t_Y(m, n)$) set $b_Y(m, n)=255$
   Else set $b_Y(m, n)=0$ For the purpose of making the description simpler, the entire image can be separated into CMYK contone separations. In practice, the algorithm can be applied pixel-by-pixel or scanline-by-scanline and it is not necessary to break the image into separations.

Figure 2D:
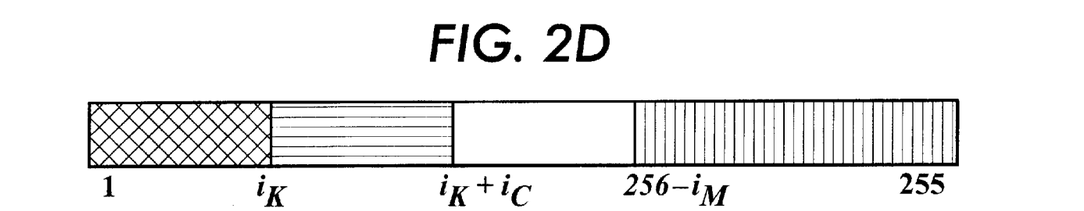

Consider the halftoning of a constant image with contone values for the CMK separations as $i_C$, $i_M$ and $i_K$, respectively (the Y separation is omitted from this discussion as it is halftoned using an independent screen). If no overlap is necessary between the C, M and K separations ($i_C+i_M+i_K<255$), the ON CMK pixels from the above algorithm populate the thresholds of the dot $S_{ckr}$ as shown in FIG. 2(d). As can be seen, the ON pixels for the different separations occupy separate thresholds and therefore avoid overlap. In addition, the halftone has good spatial frequency characteristics on account of the design criterion incorporating the simultaneous printing from both ends into the design process.

Note that the invention may be generalized to use alternate spatial partitions of the screen in the design process or to directly design with good spatial characteristics under simultaneous filling from both directions (from 0 going up and coming down from 255). Also, note that the Cyan region could be adjacent to magenta (in thresholds) instead of being next to black and the scheme for allocation of the thresholds may be permuted between the separations.

Although the invention has been described with reference to designing combined screen partitions or conjugate screens, and then rendering such designed screens for improved image quality, the invention is applicable to another embodiment wherein the design process is directed to designing distinct but correlated screens in a manner to similarly achieve maximal ink dispersion and optimized spatial frequency response.

Two or more stochastic screens can be designed simultaneously by not only using the optimization criteria for conventional stochastic screens, but also applying an additional merit requirement during the design process for screen optimization. A merit function is applied to identify the effect of a combination of the appropriate screens, which if used for respective color separations, provides a desired ink dispersion and special frequency response.

Figure 3:
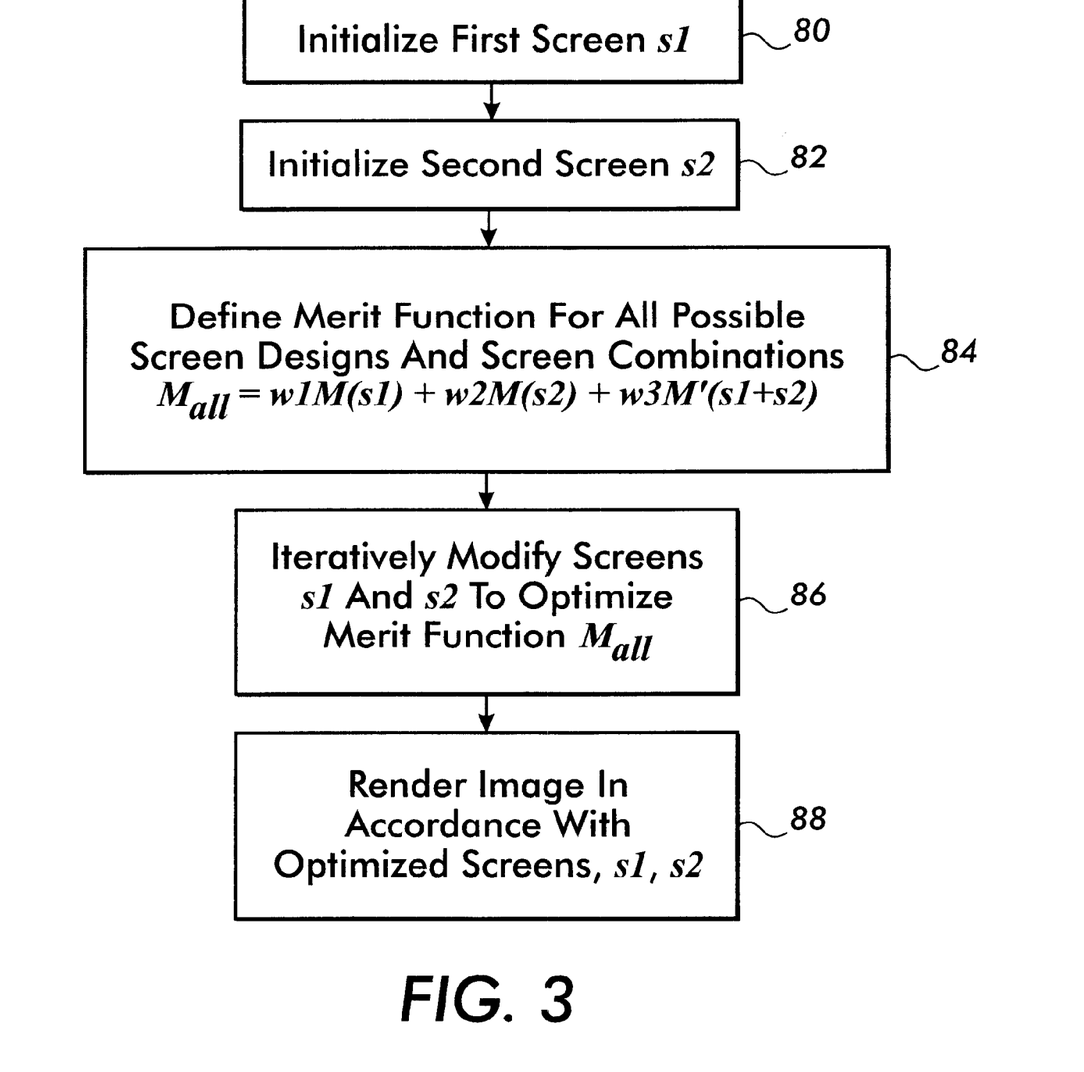
FIG. 3 is a flowchart illustrating the process steps of one embodiment of the invention.

With particular reference to the flowchart of FIG. 3, the design process for more than one stochastic screen, which can be used for simultaneous screen design for different color separations, is illustrated. Two randomly selected 80, 82 screen configurations s1, s2 are chosen first. The optimization merit function for each screen is given by M(s) in a manner as noted in the foregoing sections. Random swapping is employed for the evaluation and design of the optimized stochastic screens. Importantly, though, the merit function is modified 84 for the design of two correlated stochastic screens as follows:

$$M_{all}=w1M(s1)+w2M(s2)+w3M'(s1+s2). \quad (9)$$

where M'(s1+s2) is the additional "merit factor" for the combined minority pixels of both the screens s1 and s2, and w1, w2, w3 are weights for balancing the overall quality. The merit function of Eq. (9) can be applied for all possible screen designs so that an optimized merit value $M_{all}$ can be identified 86 and the corresponding screen designs s1, s2 corresponding to the optimized merit value can be selected for image rendering 88.

There are four different possibilities for combination of minorities used by two screens: black minorities by s1 and black minorities by s2, white by s1, s2, black by s1 and white by s2, and black by s2 and white by s1. These possibilities can be counted or, for certain applications, such as for smoothing highlight color output, only the black and black combinations need by counted. Thus, the definition of M'(s1+s2) is very similar to the single screen merit function M(s) noted above, except that the novel merit function counts all minority pixels generated by both s1 and s2.

Figure 5:
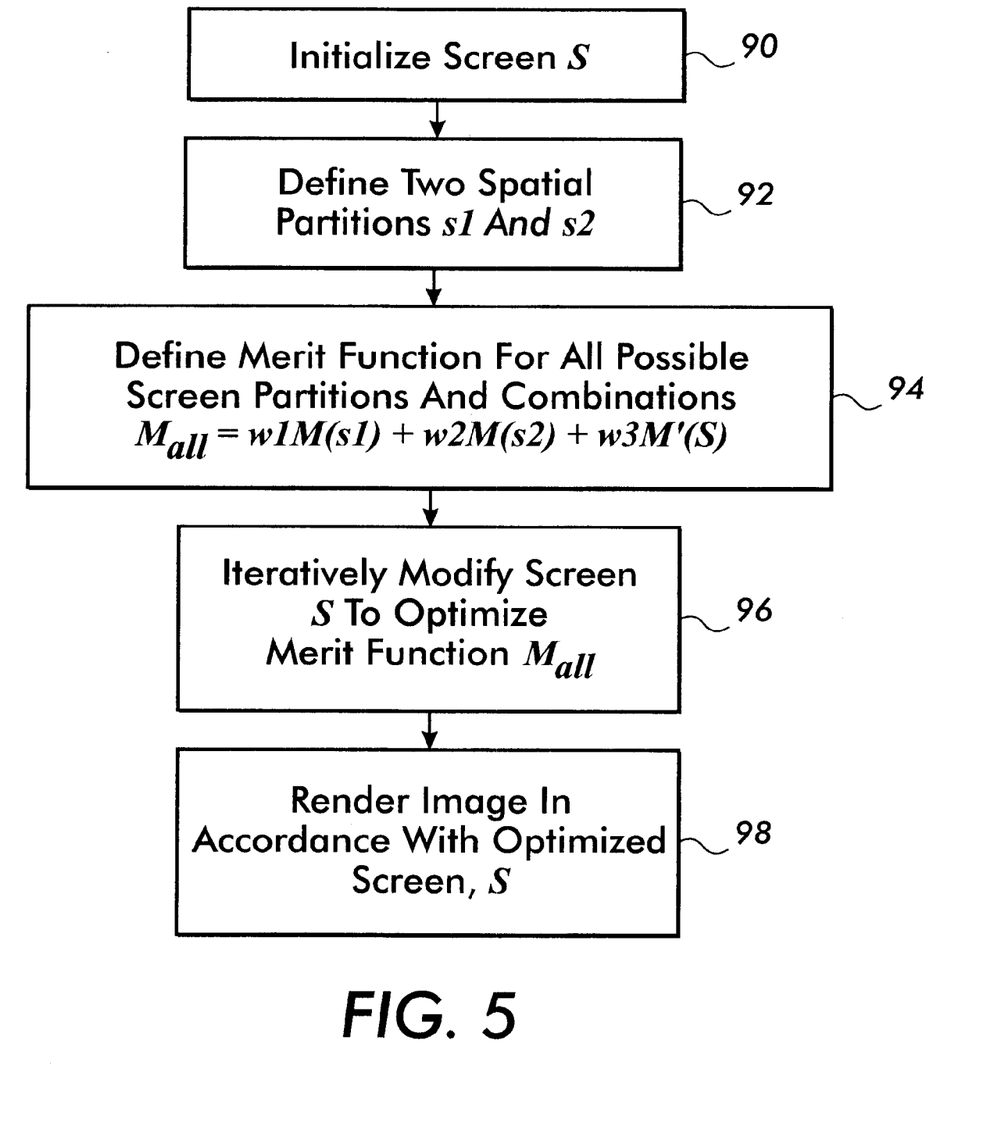

With particular reference to the flowchart of FIG. 5, the design process for a single spatially-partitioned stochastic screen, wherein the partitions can be used for the highlight regions of different color separations, is illustrated. An original screen S is initialized 90 and two spatial partitions thereof s1 and s2 are defined 92, practically corresponding to the first and second screens as in the process of FIG. 3. The optimization merit function for all possible screen partitions and combinations is defined 94 in a manner as noted in the foregoing descriptions. Iterative modification 96 of the screen S using evaluated merit values is employed for the construction of the optimized stochastic screen. The merit function for the design of two correlated stochastic partitions is the same as Eq. (9) above wherein s1 and s2 correspond to the two spatial partitions. The optimized screen design can be selected for image rendering 98.

The invention also envisions incorporating additional constraints on the screen design process in the framework of the merit function of Eq. (9). An example of such a constraint is the case where s1 and s2 are conjugate screens, i.e., threshold_s1(x, y)=N-threshold_s2(x, y) for a screen with N gray-levels. This factor would then produce a single screen such that when the original and conjugate screens are used for different separations, the halftone textures for the combinations are also optimized. The advantage of having a single screen is reduced system storage requirements over the requirements for distinctive independent screens per separation.

The invention has been described with reference to preferred embodiments, obviously alterations and modifications will occur to those of ordinary skill in the art. It is our intention to include all such equivalents within the scope of the invention. In particular, the invention need not be limited to printing and may be applied to other color display devices that have limited color depth at each pixel.

Having thus described the preferred embodiment, we now claim:

1. A method for designing a plurality of correlated stochastic screens intended for use in color-halftoning, the method comprising:

associating a merit function with each screen, said merit function representing a measure of the desirability of the screen;

associating additional merit functions with selected combinations of the screens, said additional merit functions representing a measure of the desirability of the screen combinations with regard to ink-dispersion and combined spatial-frequency response; and, constructing the plurality of screens to optimize the merit functions.

2. The method as defined in claim 1, wherein the optimizing comprises optimization of a selectively weighted average of the merit functions.

3. The method as defined in claim 2, wherein the constructing comprises an iterative process for computing a merit value indicative of the desirability of each screen and the screen combination, said process starting with a an initial set of screens and iteratively modifying the screens to optimize the merit value.

4. The method as defined in claim 3, wherein the merit functions are based on placement of minority pixels for a plurality of color values.

5. The method as defined in claim 4, wherein the number of screens is two.

6. The method as defined in claim 4, wherein one screen comprises a conjugate of the another screen.

7. The method as defined in claim 5 wherein the merit function is represented by the equation:

$$M_{all}=w1M(s1)+w2M(s2)+w3M'(s1+s2)$$

where $M_{all}$ is a value representing the optimized merit function;

M( ) is the merit function;

s1 is the first screen;

s2 is the second screen;

M'(s1+s2) is the additional merit for combined minority pixel locations for both screens s1 and s2; and, w1, w2 and w3 are selectively chosen weights.

8. A method for halftoning a color image using a plurality of correlated stochastic screens corresponding to a plurality of color separations, the method comprising:

associating a merit function with each screen, said merit function representing a measure of the desirability of the screen;

associating an additional merit function with a combination of the screens, said additional merit function representing a measure of the desirability of the screen combination with regard to ink-dispersion and combined spatial-frequency response;

constructing the plurality of screens for optimizing the merit functions; and, halftoning the image in accordance with the constructed screens.

9. The method in claim 5 wherein two correlated stochastic screens are used and additional separations are halftoned using the same screens.

10. A method for designing a plurality of correlated stochastic screens intended for use in color-halftoning, the method comprising:

partitioning a spatial-support of a stochastic screen into sets of pixel locations;

associating a merit function with a fill-order for each set of pixel locations, said fill-order determining a sequence in which the pixel locations will be turned on as an input image value is increased starting from a minimum at which all pixel locations are off to the maximum at which all pixel locations are on, wherein said merit function represents a desirability of halftone textures obtained using the fill-order in a corresponding set of pixel locations when other pixel locations are unprinted;

associating additional merit functions with selected combinations of fill-orders for multiple sets of pixel locations, said additional merit functions representing the desirability of the halftone textures obtained for combinations of fill-orders of the multiple sets of pixel locations;

constructing the fill-orders for the pixel locations to jointly optimize the merit functions.

11. The method as described in claim 10 further including a screen generation step wherein a complete fill-order for each separation is obtained by concatenating the fill-orders for the different sets of pixel locations in a chosen sequence, and wherein a complete fill-order is utilized to create a screen.

12. The method as described in claim 10 wherein two partitions are employed.

13. The method as described in claim 12 wherein the partitions comprise a checkerboard pattern.

14. The color rendering method as defined in claim 12 wherein the screen is a stochastic screen designed through application of a merit function represented as:

$$M(S)=w0M(S)+w1M(S1)+w2M(S2)$$

wherein M( ) is the merit function, S is a stochastic screen, S1 is a first partition of the screen, S2 is a second partition of the screen and w0, w1 and w2 are selectively chosen weights.

15. A correlated stochastic screen design for halftoning a plurality of color separations for minimizing color interseparation overlap comprising a first screen associated with a first color separation and a second screen associated with a second color separation, wherein the first and second screens are defined by application of a selected merit function to the screens and combinations of the screens for computing an optimized merit value indicative of maximal ink dispersion and optimized spatial frequency response in the halftoning of the color separations.

* * * * *